Jan. 9, 1940.  E. R. FOLLMAN ET AL  2,186,783
SWIVEL ADAPTER FOR HAY CARRIERS
Filed April 5, 1939
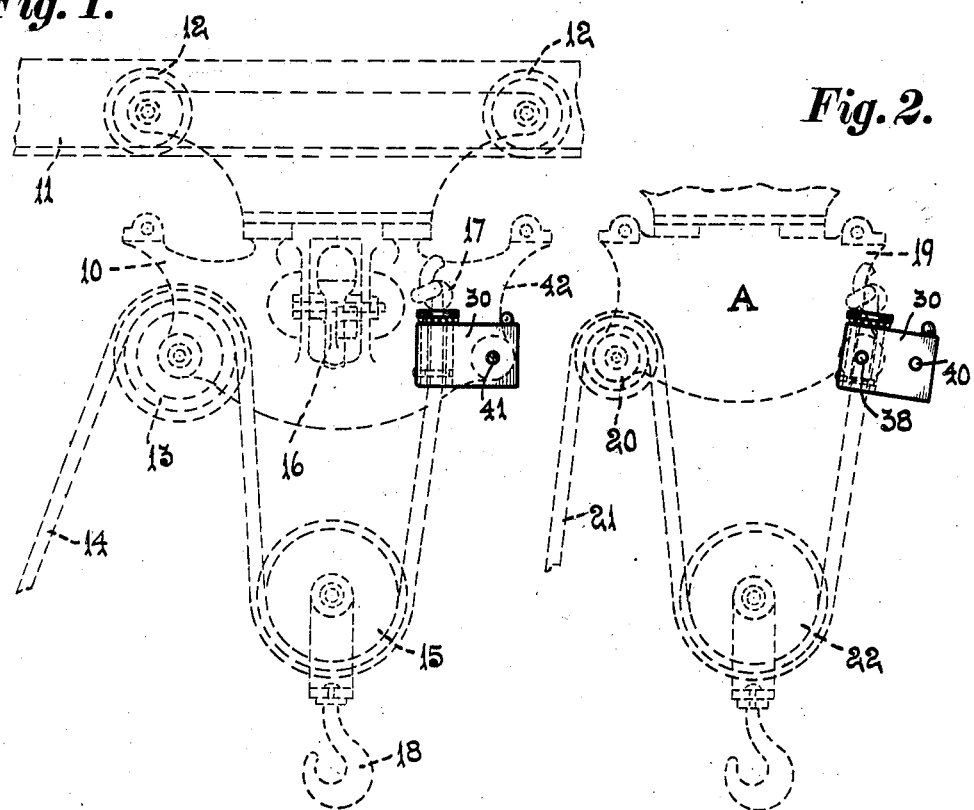
E. R. Follman
Gus Follman
Inventors
Arthur H. Sturges
Attorney Patented Jan. 9, 1940

2,186,783

UNITED STATES PATENT OFFICE 2,186,783

SWIVEL ADAPTER FOR HAY CARRIERS

Ervin R. Follman and Gus Follman, Bridgewater, Iowa

Application April 5, 1939, Serial No. 266,107

2 Claims. (Cl. 212—104)

This invention relates to hay carriers and more particularly to swivels for the dead end of elevator ropes of hay carrier mechanisms and has for an object to provide a device which may selectively be attached to any one of two or more different types of hay carriers readily with a minimum amount of time and labor for facilitating and improving the operativeness of a selected carrier during an elevation and transportation of loads of hay into the hay lofts of barns for storage of the hay.

A further object of the invention is to provide a device of economical construction having few parts which are certain of operation whereby implement dealers or the like are relieved from the necessity of carrying in stock a quantity of swivels of different types, each of said types being adapted to only cooperate with an individual type of hay carrier.

Other and further objects and advantages of the invention will be obvious from the following detailed description thereof, reference being had to the accompanying drawing in which:

Figure 1 is a side elevation of the adapter of the present invention as applied in an operative position to a certain type of elongated hay carrier the latter being depicted in dotted lines.

Figure 2 is a view similar to Figure 1 and showing said adapter applied to a different and shorter type of hay carrier.

Figure 3 is a longitudinal vertical section of the device of the present invention, the view being taken on line 3—3 of Figure 4.

Figure 4 is a top plan view of the new device.

Figure 5 is an end elevation thereof.

Figure 6 is a top plan view of the new device certain stub-axles employed being represented by means of dotted lines.

Figure 7 is a view similar to Figure 6, in which the said stub-axles are depicted by means of full lines.

Referring now to the drawing for a more particular description the hay carrier shown in Figure 1 includes two elongated frame members 10 which are oppositely disposed in side by side alignment and spaced apart a predetermined distance with respect to each other and secured together by means of removable bolts. In use said frame members are disposed horizontally and in parallelism with respect to a track 11, the latter extending into the hay loft of a barn adjacent the peak of the roof thereof and from the exterior of said barn in a well known manner. The rails of the track 11 support rollers 12 of the hay carrier mechanism in a well known manner.

The hay carrier outlined in Figure 1 is of conventional type such as or similar to that hay carrier illustrated on page 712 of the spring and summer catalogue of 1938 of Montgomery Ward & Co., and a large number of said hay carriers are now in use by private individuals, being secured to their barns, each being provided with a sheave wheel 13 disposed at opposite ends of their frames and one of said sheave wheels is discarded in the practice of the present invention.

The Montgomery Ward & Co. hay carriers employ an elevator rope 14 which extends over the wheel 13 for supporting a pulley wheel 15. From the wheel 15 the rope 14 extends towards the carrier mechanism and extends over the said discarded sheave, the latter and the sheave 13 being equidistantly spaced from the middle of the carrying frame thereof whereby at times when the rope 14 is pulled the pulley wheel 15 is caused to ascend in vertical alignment with the middle of the carrying frame 10 for actuating a lock mechanism dog generally indicated at 16, the latter being disposed in the middle of the frame 10 and as thus described it will be understood that unless the pulley wheel travels upwardly in said alignment or approximately in said alignment that the lock mechanism 16 will not become actuated thereby, thus making it essential that the swivel of the device of the present invention be positioned so that it occupies the space formerly occupied by the perimeter of said discarded sheave prior to an insertion of the new device into said type of carrier mechanism in order that the pulley wheel 15 will ascend in said vertical alignment for actuating the said lock mechanism 16 and in the practice of the present invention at times when the new device is inserted in said carrier one end of the rope 14 is provided with a dead end, the advantages thereof being later described, said end being provided by tying a knot 17 at said dead end after the latter has been inserted through a later described swivel sleeve of the new device.

The pulley wheel 15 carries a hook 18 which is attached to a grapple spear-hook device, not shown, the latter being inserted into a load of hay carried by a wagon at times when the latter is positioned under the hook 18 in a well known manner.

Referring to Figure 2 the hay carrier there depicted may be such as or similar to that hay carrier illustrated on page 747 of the spring and summer catalogue for 1938 of Sears, Roebuck & Co. The hay carrier of Figure 2 includes oppositely disposed frame members 19 which are similar to the frame members 10 except that they are of an appreciably lesser length. The hay carrier depicted in Figure 2 is provided with a track and rollers, not shown, and also with a sheave 20 of smaller diameter than the sheave 13 and a like oppositely disposed sheave, not shown, the latter being discarded at times when the new device is substituted therefor. The hay carrier of Figure 2 includes an elevator rope 21 which extends over the sheave 20 and to a pulley 22 and to the new device, the latter being positioned differently when attached to the hay carrier of Figure 2 than at times when the new device is attached to the hay carrier of Figure 1, since said hay carrier of Figure 2 is shorter it is not necessary to cause the later described swivel sleeve to project as far inwardly of the frame 19 as is necessary for the carrier of Figure 1, in order to cause the pulley wheel 22 to ascend in vertical alignment with the middle of the frame 19 for actuating a locking dog mechanism, not shown, which is positioned at A with respect to the frame.

As thus described it will be understood that for hay carriers having elongated frames it is necessary for the swivel sleeve of the new device to be positioned a greater distance inwardly from one end of such frames, as shown in Figure 1, than is necessary at times when the new device is applied to comparatively shorter frames, as shown in Figure 2, for actuating either of the said locking mechanism dogs by means of the pulley wheel at times when the latter ascend sufficiently to strike either of said dogs and that the adapter of the present invention is so arranged that it may be included in either one of the said different types of hay carrier mechanisms.

The new adapter device includes a block 30 having parallel, oppositely disposed side walls 31. A bore 32 is provided at one end of the block for the reception therein of a sleeve 33. The sleeve at one end is provided with a flange 34 between which and said block anti-friction balls 35 are disposed and as thus described it will be noted that the sleeve is rotatably carried by said block. Means are provided for preventing longitudinal sliding movements of the sleeve 32 with respect to the block for preventing a loss of the balls 35 from their ball race tracks, said means preferably including a set screw 36 which extends through an end of the block 30 and into an annular recess 37 provided on the perimeter of the sleeve whereby a rotary movement of the sleeve is permitted and the end of said set screw prevents longitudinal sliding movements of the sleeve at times when said end is within said annular recess.

The new article of manufacture further includes a stub-axle 38 disposed outwardly from each side wall 31 of the block at right angles with respect to the bore of the sleeve 33, said stub-axles being preferably cast or formed integral with the block and for installation of the new device within the frame of the hay carrier mechanism, shown in Figure 1, the stub-axles are first removed as later more particularly explained.

A detent 39 is provided outwardly from opposite sides of the block adjacent one end thereof, said end being opposite with respect to the end of the block which carries the sleeve 33 for purposes later described.

The detents 39 are preferably formed integral with the block 30 and are disposed preferably as shown in Figures 3, 4 and 5.

The detents 39 are disposed in parallelism with the stub-axles 38. The block 30 is further provided with an aperture 40 which extends transversely therethrough and in parallelism with respect to said detents and stub-axles.

In order to install the new adapter device during practice into either one of two different types of hay carriers of different lengths and assuming that said adapter is to be installed in the hay carrier outlined in Figure 1 the stub-axles 38 are first removed since the transverse width of the block is substantially equal to the transverse thickness of the discarded sheave of the hay carrier of Figure 1.

After said sheave has been removed the new device is inserted between the half portions 10 of the frame and the axle pin 41 of said discarded sheave is reinserted into its former position and through the aligned shaft holes of each half portion 10 of the frame and also through the aperture 40 of the new device, the detents 39 of the latter engaging against the end edges 42 of the frame portions 10, as shown in Figure 1, for preventing swinging movements of the sleeve 33 in one direction and maintaining the new device in an operative position during use with said longer hay carrier as later described.

In practice and for installation of the new adapter upon the shorter hay carrier, shown in Figure 2, the stub-axles 38 are employed, the latter being received in the shaft holes for the axle shaft pin of the discarded sheave of the carrier mechanism, shown in Figure 2, and in order to install the adapter within said carrier it is necessary to first loosen the bolts which hold the two half portions of the carrier frame together and after installation of the new device said bolts are replaced and tightened for securing the sleeve, in particular, operatively thereto. It will be understood that as thus described swinging movements in a vertical direction of the block are permitted at times when the latter is installed in the carrier mechanism outlined in Figure 2 and that at times when a stress is applied to the rope 21, as in use, during hay elevating operatings that the sleeve 33 is thereby caused to automatically align with the longitudinal length of rope below the sleeve and swiveling movements of the dead end of said rope are permitted as later described.

The advantage of dead ending the elevator rope of a hay carrier mechanism and providing said dead end with means for permitting truning movements thereof are known to the prior art and taught in U. S. Patent No. 769,175 and in substance said advantages are that by providing means for permitting said dead end of the rope to rotate the same prevents portions of the elevator rope which extend from said pulleys to the carrier mechanism from twisting about each other in a manner whereby it is impossible to elevate the load of hay until untwisted by hand operations.

As thus described it will be understood that the new adapter provides means for permitting the dead end of elevator ropes of hay carrier mechanisms to rotate while the weight is carried upon a ball bearing for facilitating rotary movements of said dead end.

From the foregoing description it is thought to be obvious that a swivel adapter for hay carriers constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish it to be understood as limiting ourselves to the precise arrangement and formation of the several parts herein shown in carrying out our invention in practice except as claimed.

What is claimed is:

1. An adapter device as and for the purpose described comprising a block, a rotatable sleeve carried by said block at one end thereof, a stub-axle extending outwardly from opposite sides of said block at right angles with respect to the bore of said sleeve, a detent extending outwardly from opposite sides of said block at that end of the latter which is opposite with respect to said sleeve, said detents being disposed in parallelism with said stub-axles, said block being also provided with an aperture extending transversely therethrough in parallelism with said detents and stub-axles, said block being adapted to be received between the oppositely disposed half portions of the frames of either one of two different types of hay carriers, said carriers being of different lengths and each provided with aligned shaft holes disposed through their said half portions at common ends of the latter, said stub-axles being adapted to be received within the said aligned shaft holes of the shorter hay carrier for securing said sleeve operatively thereto, said aperture of the block being adapted to receive a keeper pin disposed therethrough and through the said shaft holes of the longer hay carrier for securing said block thereto and disposing said sleeve in operative position at times when said stub-axles are removed from said block, said detents being adapted to engage against edges of the half portions of said longer frame for maintaining said operative position of the block with respect to said longer hay carrier, said sleeve being adapted to receive therethrough the dead end of the load raising rope of the hay carrier selected for facilitating a securing of said rope axially of said bore and to said sleeve for permitting said rope-end to swivel during hay elevating operations, and means for preventing longitudinal sliding movements of said sleeve with respect to said block.

2. As an article of manufacture to be used for the purpose described, a block provided with a bore disposed at one end thereof, a rotatable sleeve disposed in said bore, a stub-axle disposed outwardly from opposite sides of said block and at right angles with respect to the bore of said sleeve, a detent extending outwardly from opposide sides of said block at that end of the latter which is opposite with respect to said sleeve, said detents being disposed in parallelism with said stub-axles, said block being also provided with an aperture extending transversely therethrough in parallelism with said detents and stub-axles, said sleeve being provided with an annular flange for preventing longitudinal sliding movements of the sleeve outwardly of said bore of the block in one direction, a ball-bearing disposed between said flange and block, and means for preventing sliding movements of said sleeve with respect to said bore of the block in a direction opposite to said first mentioned direction.

ERVIN R. FOLLMAN.
GUS FOLLMAN.